United States Patent [19]

Kontz

[11] 4,223,778

[45] Sep. 23, 1980

[54] PARISON HANDLING ASSEMBLIES AND METHODS FOR HANDLING PARISONS

[75] Inventor: Robert F. Kontz, Toledo, Ohio

[73] Assignee: Owens-Illinois, Inc., Toledo, Ohio

[21] Appl. No.: 905,315

[22] Filed: May 12, 1978

[51] Int. Cl.$^2$ .................. B65G 43/00; B65G 42/24; B65G 47/04

[52] U.S. Cl. .................. 198/389; 198/524; 198/531; 221/165

[58] Field of Search .......... 198/389, 468, 397, 524, 198/531, 491; 221/165; 425/534

[56] References Cited

U.S. PATENT DOCUMENTS

| | | | |
|---|---|---|---|
| 2,341,014 | 2/1944 | Blair | 221/165 |
| 2,753,058 | 7/1956 | Potthoff et al. | 198/524 |
| 3,517,797 | 6/1970 | Daleffe et al. | 198/389 |
| 4,010,841 | 3/1977 | Bonzack | 198/531 |

*Primary Examiner*—Joseph E. Valenza
*Assistant Examiner*—Brian Bond

*Attorney, Agent, or Firm*—Charles S. Lynch; Myron E. Click; David H. Wilson

[57] ABSTRACT

A parison handling assembly receives tubular plastic parisons from a random bulk storage, orients the parisons, and feeds the parisons in a controlled manner to one or more blow molding machines. Parisons are stored in the random bulk storage and fed at a controlled rate by a metering apparatus to a parison orienter which orients the parisons into a closely grouped arrangement wherein the parisons are both upright and side-by-side. The parisons are fed from the parison orienter to a parison escapement mechanism which holds the parisons temporarily. The escapement mechanism is actuated to release parisons into a parison transporter depending on the production demands of the individual blow-molding machines. Released parisons, from the parison escapement mechanism, move along the parison transporter to be pushed axially into stuffer tubes. The stuffer tubes hold the parisons in properly oriented, end-to-end relationship for delivery to the actual loading station of the blow-molding machine.

11 Claims, 18 Drawing Figures

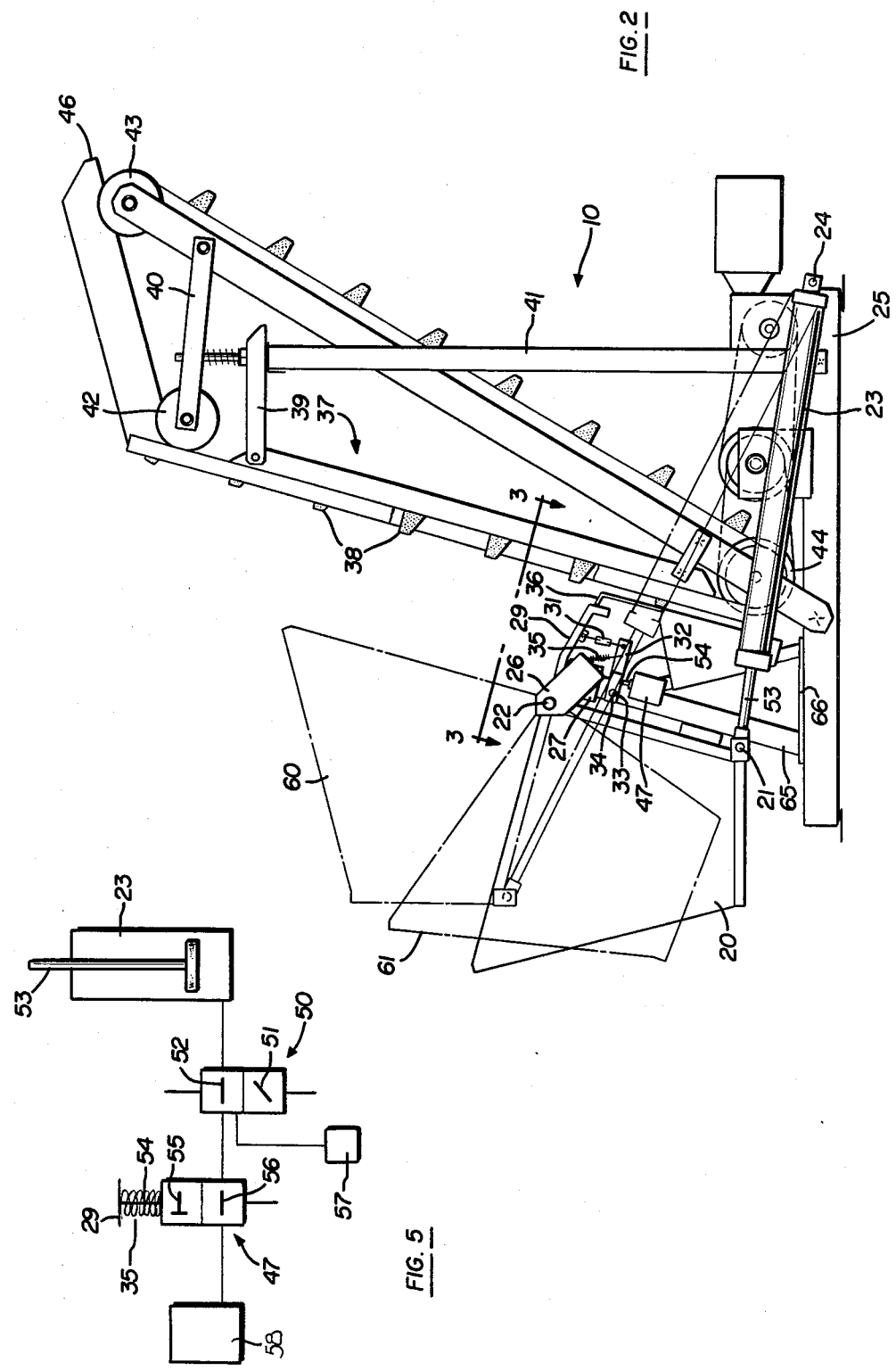

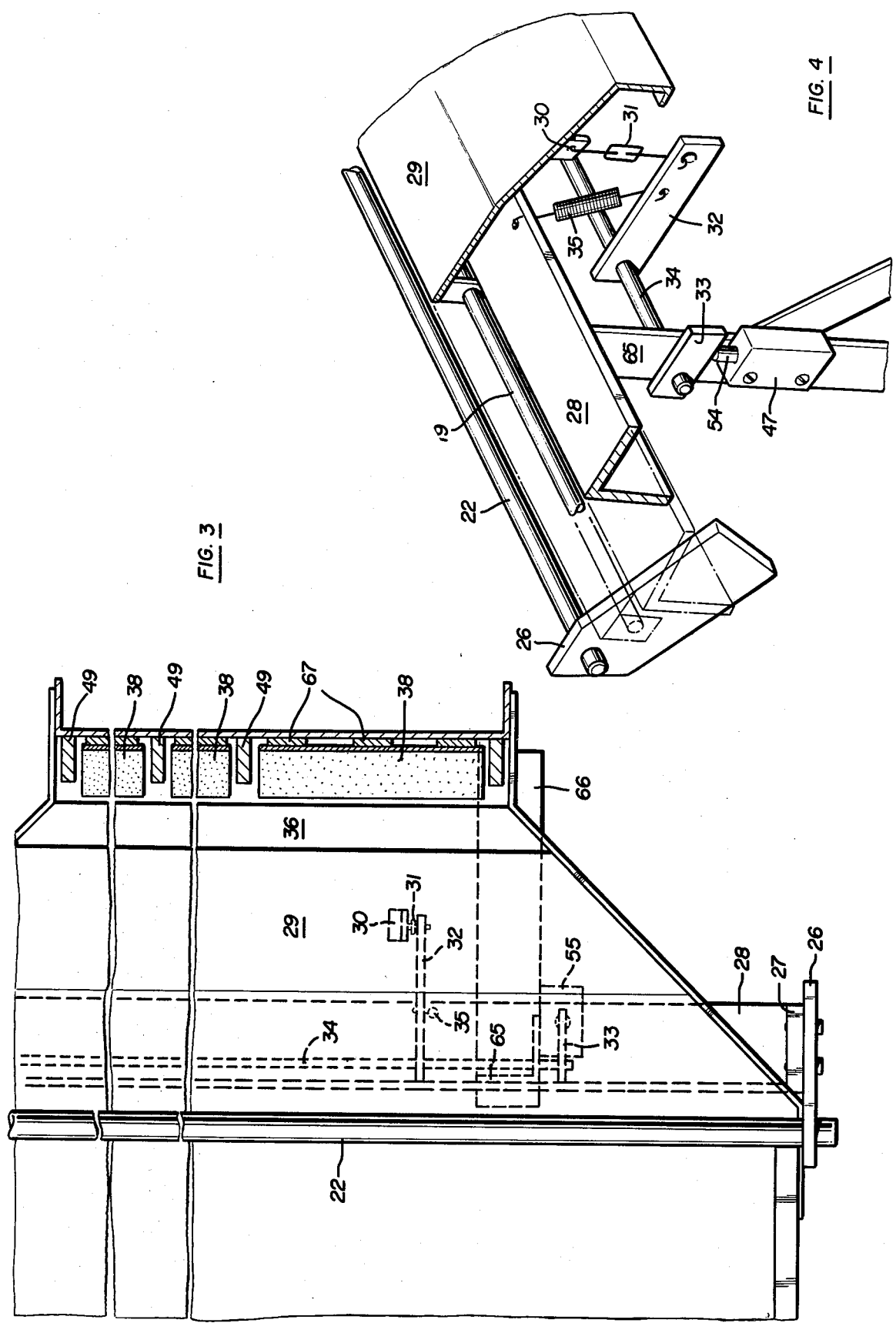

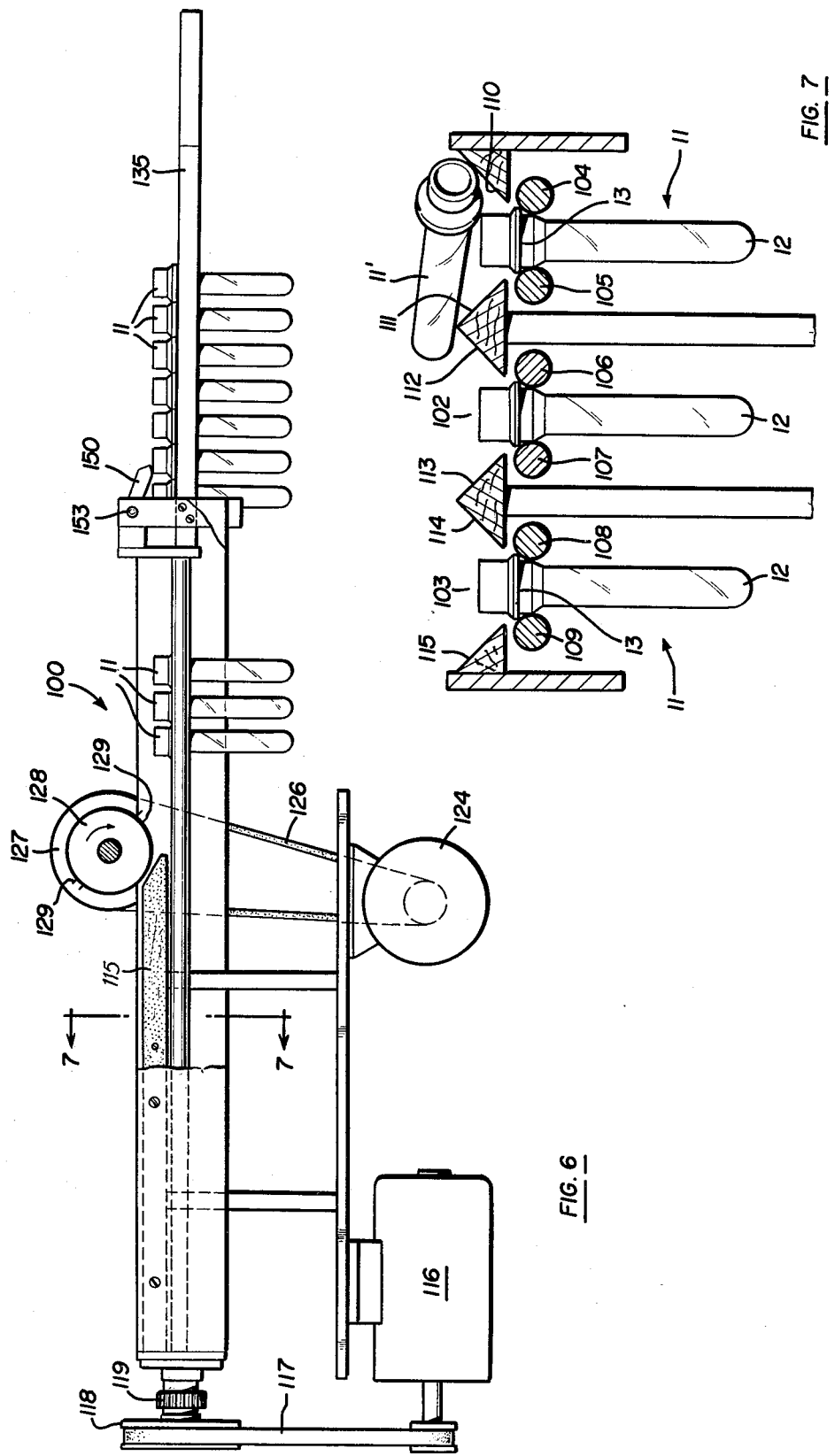

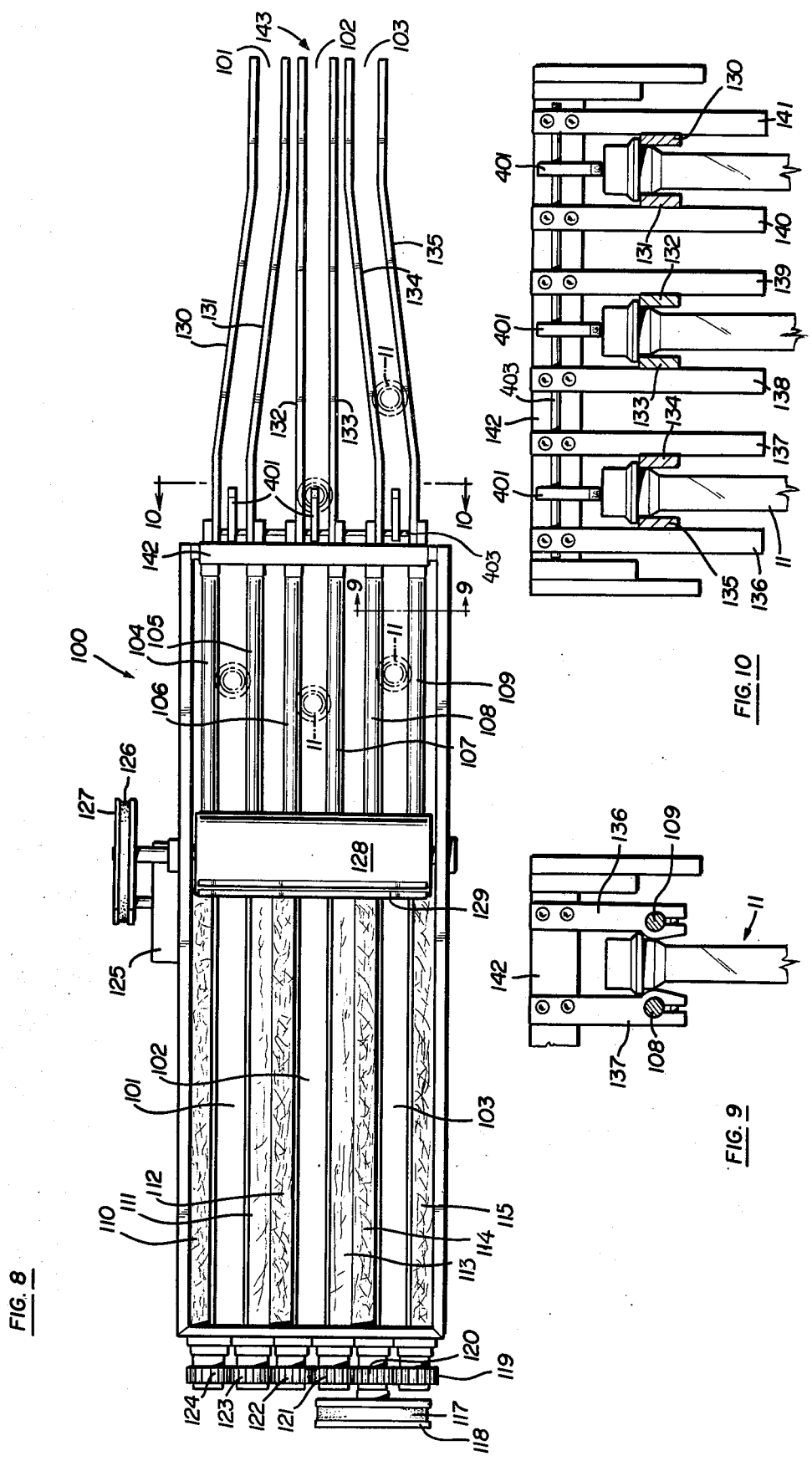

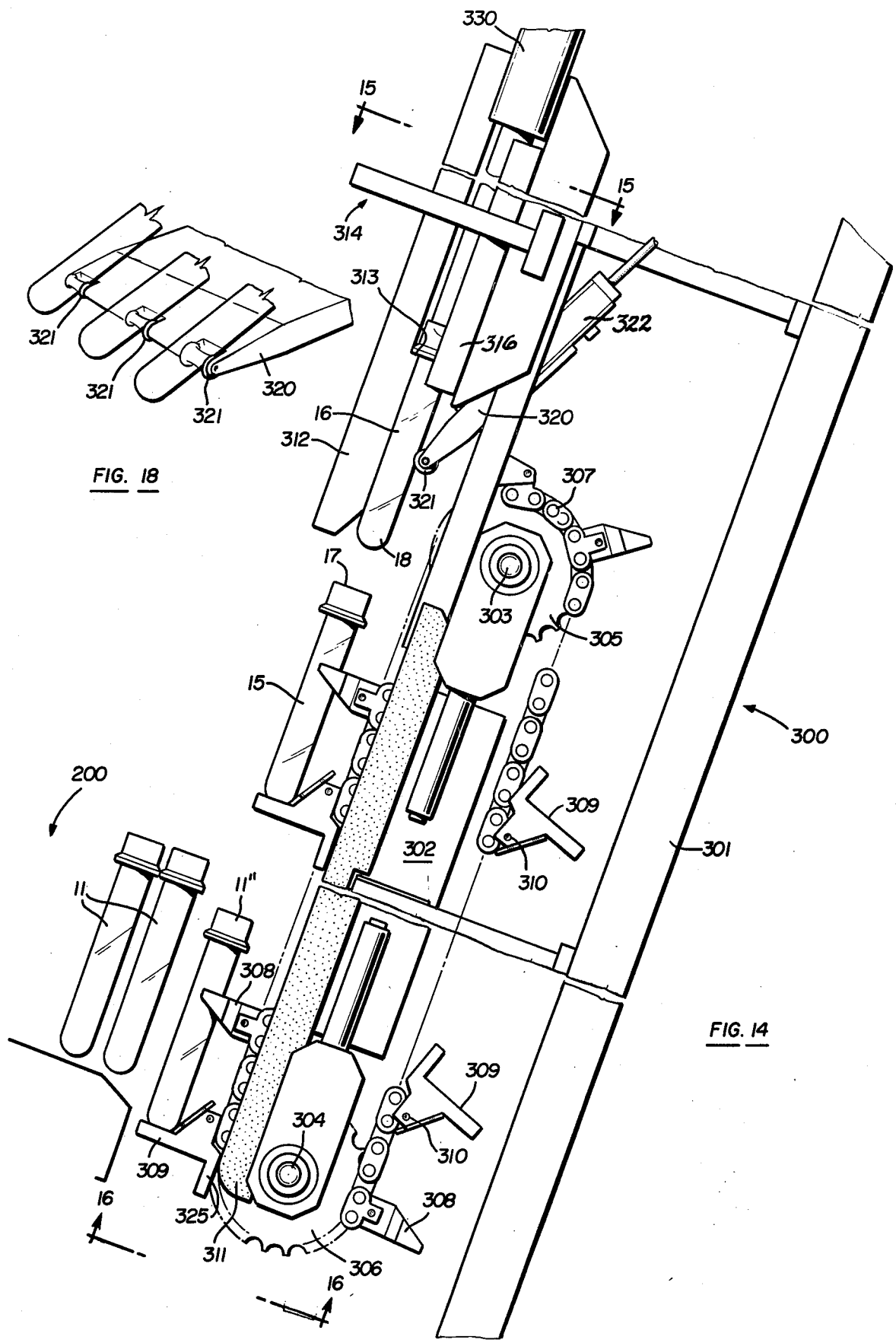

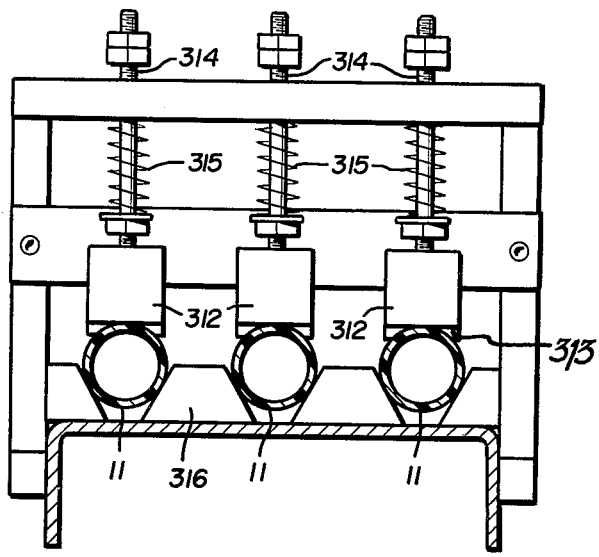
FIG. 15
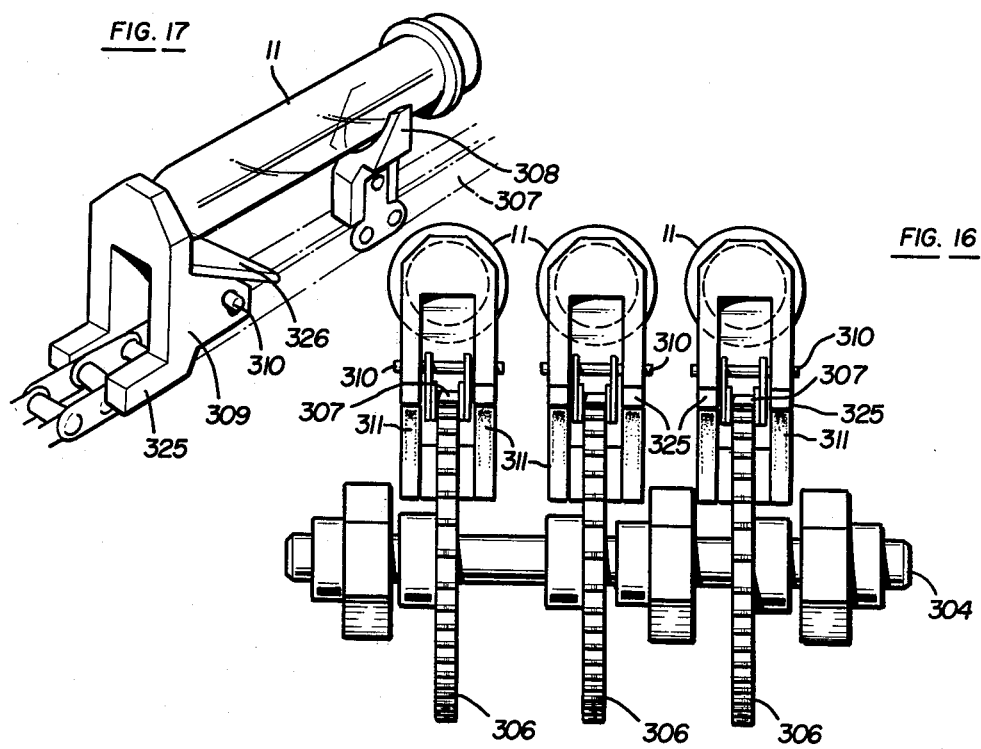
FIG. 17
FIG. 16

PARISON HANDLING ASSEMBLIES AND METHODS FOR HANDLING PARISONS

BACKGROUND OF THE INVENTION

This invention relates generally to handling and transporting plastic articles, such as blowable plastic parisons, from a remote bulk storage location to the load stations of one or more blow-molding machines.

The art forming bottles and containers by blow-molding has advanced to the stage where several thousands of such articles can be blown each hour. Methods and apparatus have developed to form blowable parisons at one location which are later transported to blow-molding machines. The freshly formed parisons are initially stored randomly in a bulk container. This necessarily requires that the blowable parisons, from which the articles are blown, be transported rapidly and inexpensively to the load stations of the blow-molding machines on demand.

A problem has existed with the previous methods and apparatus for parison handling in that much of the handling was done manually and with apparatus which handled the parisons roughly. Thus the previous apparatus for handling parisons tended to cause more than an acceptable amount of marking on the parison bodies, which markings show as a defect in the finally blown bottle. There was a need for reliable apparatus that would quickly transport the parisons from the bulk storage to the blow molding machine on demand and without marking the bodies of the parisons.

SUMMARY OF THE INVENTION

The present invention overcomes the previous problems of transporting parisons from a remote bulk storage location to the load stations of blow molding machines. The invention includes four components which, when interconnected, make up the total parison handling assembly. The four components are a metering apparatus, a multi-lane parison orienter, a multi-lane parison escapement mechanism, and a parison transporter mechanism. Collectively, these four component mechanisms constitute the only equipment necessary to move parisons from a bulk storage area to load stations of the blow-molding machines.

The present invention contemplates, but is not intended to be limited to, the use of three blow molding machines. Since any one machine, at any given time, may require feeding at a different rate from the other machines, each machine is provided with its own feed lanes. The metering apparatus conveyor, the parison orienter, the parison escapement mechanism, and the parison transporter, each have three feed lanes so that each blow-molding machine is fed independently. The invention is not limited to three blow molding machines, and the present invention may be modified to provide feeding to a greater or lesser number of blow-molding machines as desired.

The metering apparatus of the present invention has a three-lane conveyor which supplies a three-lane parison orienter. The conveyor receives parisons at a controlled rate from a bulk storage container. One of the features of the present invention is that the number of parisons at the conveyor "take" location is kept to a minimum to minimize any stirring and abrading action on the parisons by the conveyor.

The parison pile is kept to a minimum by a unique control system that causes the bulk storage container to dump parisons onto a load plate intermediate the bulk container and three-lane conveyor. Parisons slide down the load plate into the conveyor at a rate that will satisfy the requirements of the blow molding machines, but the number of parisons at the conveyor "take" location is controlled to minimize marking of the parison bodies. The control system is automatic, so that no operator attention is required while the metering apparatus provides parisons to the three-lane orienter at a rate such that each of the blow molding machines is capable of producing several thousand bottles per hour.

The three-lane parison orienter receives the parisons from the conveyor and orients them into a closely grouped, aligned arrangement wherein the parisons are upright and side-by-side. Each lane of the parison orienter is independently fed by a respective feed lane of the metering apparatus conveyor. Another feature of the present invention is that the parisons undergo minimal vibrating, tumbling, and parison-to-parison contact because of the apparatus for orienting the parisons.

The parison orienter has three pairs of spaced rotating shafts, a pair for each feed lane. Spaced slightly above and separating the pairs of rotating shifts are inclined directing surfaces. As the parisons fall into an individual lane, they are immediately directed between the pair of rotating shafts in that lane. The parison end portions tend to fall through between the rotating shafts because of gravity. The shafts are spaced apart a distance such that only the parison end portions fall through between them, while the parison neck portions, which are thicker than the end portions, are held by the rotating shafts.

Many of the parisons are quickly oriented as they fall into the orienter because their end portions immediately pass downwardly between the rotating shafts. The shafts rotate to keep the unoriented parisons active until their end portions also fall through between the shafts. There will be a very few parisons that remain unoriented and are carried along with the oriented parisons.

A roller with a flexible wiper attached thereto lies transverse to the parison feed path and is spaced slightly above the tops of the oriented parisons. The oriented parisons pass underneath the roller, but the unoriented parisons are kicked back until an opening in the line of oriented parisons permits the end portions of the unoriented parisons to fall through. All the parisons that pass under the roller are oriented.

The oriented parisons move along three lanes from the parison orienter to a three-lane parison escapement mechanism. The parison escapement mechanism will release parisons to a parison transporter depending on the demand by the individual blow molding machines. A release mechanism is mounted to the end of each escapement feed lane. The release mechanisms are actuated independently of each other by high-low switches on the stuffer tubes feeding the load stations of the individual blow molding machines.

The release mechanisms of the parison escapement mechanism provide gentle handling of the parisons and thereby minimize parison marking. They also permit the parison feed lanes to be closely spaced together. The release mechanisms are designed to release one parison at a time while holding in place the other parisons of a respective feed lane.

A three-lane parison transporter receives the released parisons from the escapement mechanism. The parisons are transported along the feed lanes of the parison transporter to be fed axially into stuffer tubes. The stuffer tubes hold the parisons in end-to-end contact, and the parisons are pushed through the tubes to the actual load stations of the individual blow molding machines.

The parison transporter uses fall-away pushers that push the parisons into the stuffer tubes and then clear away for following parisons. The parisons are held by an aligning mechanism at the entry of a stuffer tube so that the end portion of one parison properly nests into the open end of the next parison. In the event of jam-up, the transporter has a friction drive that prevents damage.

Other advantages and meritorious features of this invention will be more fully appreciated from the following detailed description and the appended claims.

BRIEF DESCRIPTION OF THE DRAWINGS

FIG. 2 is a side elevational view of the parison metering apparatus.

FIG. 3 is a cross-sectional view taken along plane 3—3 of FIG. 2 showing the load plate and metering apparatus conveyor.

FIG. 4 is a side elevational view, with parts broken away and in section, of the load plate and its connection to the control valve.

FIG. 5 is a schematic representation of the control system for the metering apparatus.

FIG. 6 is a side elevational view of the three-lane parison orienter.

FIG. 7 is a cross-sectional view taken along plane 7—7 of FIG. 6 showing the three feed lanes and directing surfaces.

FIG. 8 is a top plan view of the three-lane parison orienter.

FIG. 9 is a cross-sectional view along plane 9—9 of FIG. 8.

FIG. 10 is a cross-sectional view along plane 10—10 of FIG. 8 showing the exit portion of the three-lane parison orienter.

FIG. 14 is a side elevational view of the three-lane parison transporter.

FIG. 15 is a cross-sectional view taken along plane 15—15 of FIG. 14 showing the entrance to the stuffer tubes.

FIG. 16 is an end view taken along plane 16—16 of FIG. 14 showing the pusher elements being cammed into operative position by cam rails.

FIG. 17 is an enlarged fragmentary perspective view showing a pusher element and a holder element.

FIG. 18 is an enlarged fragmentary perspective view showing the rollers of the aligning cylinder.

DETAILED DESCRIPTION OF THE PREFERRED EMBODIMENTS

Parison Handling Assembly

Figure 1:
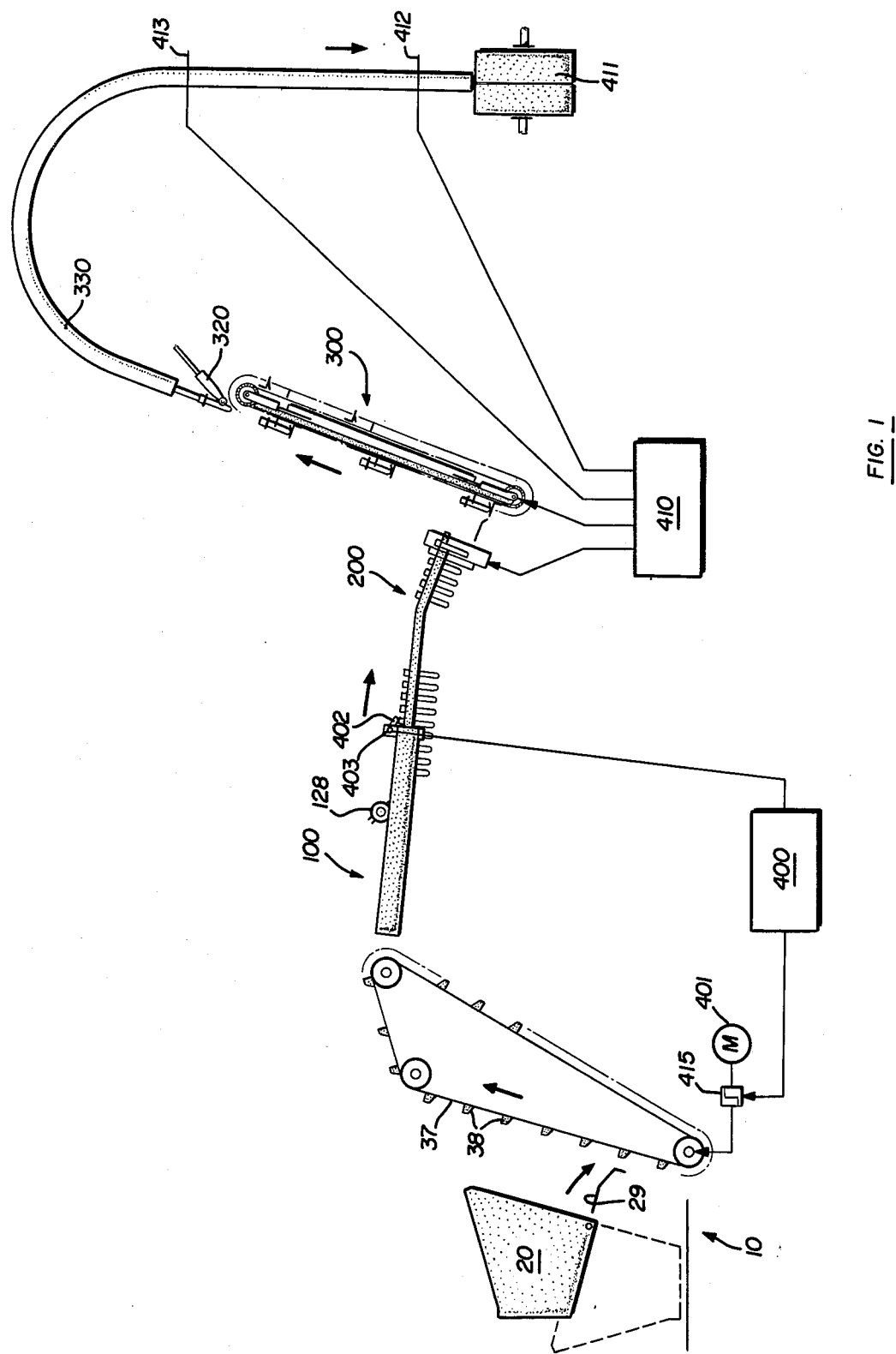
FIG. 1 shows the overall parison handling assembly including a parison metering apparatus, a three-lane parison orienter, a three-lane parison escapement mechanism, and a three-lane parison transporter.

The overall parison handling assembly is shown in FIG. 1 and it includes: a parison metering apparatus 10, a 3-lane parison orienter 100, a 3-lane parison escapement mechanism 200, and a 3-lane parison transporter 300, each of which will be subsequently described in detail.

Parison Metering Apparatus

Referring to FIG. 2, the metering apparatus 10 of the present invention has as its basic components a single bulk hopper or container 20, a load plate 29, and a conveyor 37. Parisons are metered from the hopper 20 onto the load plate 29 and then into the conveyor 37.

The parisons are not directly fed from the hopper 20 into the conveyor 37 because it is important that the depth of the parison stack at the conveyor intake 36 be kept to a minimum. This minimizes stirring and abrading action from conveyor paddles 38 that tends to mark the parisons.

The parisons are stored in the hopper 20 in amounts sufficient to satisfy the requirements of blow-molding machines which ultimately receive the parisons. A blow molding machine produces approximately 2,000-7,200 bottles per hour from the parisons, and the parison feeding must be such that there is always a backlog sufficient to keep the blow-molding machines operational.

The bulk container 20 is pivotally mounted on pivot shaft 22 for movement from the whole line position of FIG. 2 to the phantom line positions 60, 61 of FIG. 2. Pivot shaft 22 is mounted at each of its ends to support plates 26 (FIG. 3). Support plates 26 are mounted to end mounting plates 27 (FIG. 3) at the ends of an elongated L-shaped beam 28, and the beam 28 is supported in fixed position by vertical struts 65 which are mounted to base plate 66.

A fluid operated cylinder 23 having a piston rod 53 is attached at one of its ends 24 to the frame 25 of the metering conveyor and the rod 53 is attached at 21 to the bulk container 20. When the fluid cylinder 23 is actuated, it causes the bulk container 20 to pivot clockwise about pivot axis 22, dumping parisons onto the load plate 29.

Referring to FIGS. 2–4, the load plate 29 serves as an intermediate parison slide member between the bulk container 20 and conveyor 37, and it also acts as a sensor to stop the bulk container from dumping more than the desired number of parisons into the conveyor. As shown in FIGS. 2 and 4, the load plate 29 is pivoted on one end on pivot shaft 19 and engages intake member 36 on its other end. Parisons pile onto the upper surface of load pplate 29 causing it to pivot downwardly under the parison weight. A turnbuckle 31 is connected to load plate 29 at one end and is connected to link 32 at its other end.

When the load plate 29 pivots downwardly under the weight of parisons, turnbuckle 31 transmits the downward movement to link 32. Link 32 is fixed to pivot shaft 34 (FIG. 3). Control arm 33 is also fixed to pivot shaft 34. Downward pivoting of link 32 turns pivot shaft 34 clockwise which in turn causes control link 33 to push plunger 54 (FIG. 4) of control valve 47 down. Tension spring 35 is fixed at one end to channel member 28 and at its other end to link 32, so that it applies a constant upward force on the load plate 29 (FIG. 2). When the bulk container is in phantom line position 60 of FIG. 2, parisons slide down load plate 29 into intake 36 of conveyor 37.

Conveyor 37 has three feed lanes to transport parisons, as best seen in FIG. 3. Each of the three lanes has a plurality of paddles 38 which convey the parisons from the conveyor intake location at 36 to discharge location 46 (FIG. 2). As shown in FIG. 3, paddles 38 are mounted on conveyor belts 67. After being discharged from the metering conveyor, the parisons are dropped onto the three-lane parison orienter indicated at 100 in FIG. 1.

Referring to FIG. 2, conveyor 37 is mounted to base 25 by support members 39, 40, 41 and drive rollers 42, 43, 44. As best seen in FIG. 3, the three lanes of paddles 38 are separated by dividers 49. As the parisons fall down the load plate 29 into the intake 36 of conveyor 37, they move along one of the three lanes of paddles to the discharge end 46 of the metering apparatus 10 and then into the three-lane orienter 100.

In FIG. 5, there is illustrated a control circuit for controlling the dumping of the hopper 20. This circuit includes a source of air under pressure 58, the valve 47 which is responsive to the position of the hopper (as above explained), a manual "off-on" valve 50, and the cylinder 23.

In operation, the manual valve is moved to its "on" position at which the valve passage 52 connects the cylinder 23 with the source 58 so long as the pivot plate 29 is not overloaded with parisons. The cylinder rod 52 is extended by the air from the source 58 until the plate is loaded. The weight of the parisons on the plate 29 pivots the plate downwardly against the bias of the spring 35 and the turnbuckle 31 depresses the actuating arm 33 to actuate valve 47 to its "off" position at which valve passage 55 cuts off the cylinder 23 from the source 58. Thus, the hopper 20 is halted in its present, raised position.

As the parisons are removed from the plate 29 by the conveyor 37, the spring 35 progressively moves the plate 29 and the arm 33 upwardly until finally the valve passage 56 again interconnects the source 58 and the cylinder 23 for the next parison supply operation.

A unique control feature of the present invention is that control valve 47 normally permits a small amount of fluid to vent or escape therethrough after the bulk container is held in the phantom position 60 shown in FIG. 2. Once stopped at phantom line position 60, the bulk container pivots slowly downwardly counterclockwise to the phantom line position 61 (FIG. 2) because of the fluid escape from control valve 47.

When the cylinder 23 is next actuated, the bulk container 29 is at phantom line position 61. The hopper 29 pivots clockwise about pivot axis 22 from phantom line position 61 instead of position 60 where it initially was held. The additional movement aids in the distribution of the parisons onto the load plate 29. Of course as the bulk container 20 is emptied, the phantom positions 60 and 61 move further clockwise around pivot axis 22.

When it is desired to refill the bulk container, manual valve 50 is turned to its "off" position 51 which vents the cylinder 23 to reservoir 57 and permits the bulk container 20 to pivot counterclockwise to its whole line position of FIG. 2.

Three-Lane Parison Orienter

Parisons are discharged from the metering apparatus 10 by the three lanes of conveyor 37. A parison orienter 100 receives the parisons from the metering apparatus 10 for the purpose of orienting and then feeding them, in a controlled manner, to a parison escapement mechanism, which will be subsequently described.

As best seen in FIG. 8, parisons from the three lanes of conveyor 37 drop into three corresponding orienting lanes 101, 102, and 103 of parison orienter 100. Each orienting lane has two power-driven shafts and two inclined directing surfaces.

As best seen in FIG. 7, orienting lane 101 has two power-driven shafts 104, 105, and two inclined directing surfaces 110, 111; orienting lane 102 has two power-driven shafts 106, 107, and two inclined directing surfaces 112, 113; and orienting lane 103 has two power-driven shafts 108, 109 and two inclined directing surfaces 114, 115.

Referring to FIG. 6, motor 116 drives belt 117 which rotates drive pulley 118. Drive pulley 118 is directly connected to drive gear 120 (FIG. 8). A plurality of gears 119–124 are intermeshed thereby forming a drive train that is driven by drive gear 120. The gears of the drive train are each respectively connected to power-driven shafts 104–109. Each of the intermeshed gears of the drive train rotates in a direction opposite from that of its neighbor gear (FIG. 8). This means that in each orienting lane the power-driven shafts 104–109 are driven opposite one another and the drive directions are such that the shafts 109, 107, 105 rotate counterclockwise and the shafts 108, 106 and 104 rotate clockwise. The counter-rotating rolls of each set do not tend to pull the parisons between the rolls. Rather, they provide moving, non-jamming surfaces, retaining the parisons in motion during orientation.

In operation, parisons 11 drop into each of the three orienting lanes to be oriented into an upright side-by-side arrangement. The spacing between adjacent power-driven shafts 104–109 is such that the parison closed ends 12 (FIG. 7) can fall between the shafts but the finish areas 13 of the parisons cannot. Therefore, when a random pile of parisons fall into each orienting lane, certain of the parisons immediately orient themselves in an upright position as seen in FIG. 7 due to the parison closed ends 12 falling between the power-driven shafts by gravity.

Other parisons 11 are able to orient themselves because the power-driven shafts 104–109 tend to keep the random pile of parisons moving along each respective lane until the parison closed ends can drop through between the shafts and thereby become oriented. The parison orienter 100 provides quick, unique, and efficient upright orientation to a plurality of randomly piled parisons.

Referring to FIGS. 1 and 6, a downward inclination, from left to right, of the orienter 100 (not shown in FIG. 6) causes the parisons to move along the orienting lanes 101–103. Occasionally, parisons will not fit into one of the oriented positions and as shown in FIG. 7, those parisons (11') will lie against the finish areas of parisons that have been oriented and will be fed along the orienter until they reach roll 128.

Referring to FIGS. 6 and 8, a transverse roll 128 is provided to gently push parisons, such as 11' shown in FIG. 7, rearwardly along the row of oriented parisons where the closed ends of unoriented parisons 11' can drop through between the power-driven shafts and become oriented. Roll 128 is driven by motor 125 by way of drive belt 126. To prevent marking of the parisons 11', roll 128 has two flexible rubber brushes 129 which extend radially outwardly from the periphery of roll 128.

As seen in FIG. 6, there is sufficient clearance for oriented parisons 11 to pass underneath roll 128 and out of the reach of brushes 129; however, if an unoriented parison 11' (FIG. 7) is carried near roll 128, it will be pushed back until its closed end can fall through between the power-driven shafts. Any parisons that pass under roll 128 are of necessity in an upright oriented position.

After being oriented, the parisons respectively move along one of the lanes 101–103 until they move off the power-driven shafts 104–109 and onto rails 130–135. As seen in FIG. 8, parisons 11 move closer together as they progress along rails 130–135 and they become more tightly grouped for the purpose of being fed to an escapement mechanism which will be subsequently described.

Referring to FIGS. 9 and 10, power-driven shafts 104–109 are mounted for rotation at their lower, discharge ends by support members 136–141. As the parisons 11 arrive at the ends of the power-driven shafts supported by vertical members 136–141, they pass under horizontal support member 142 as seen in FIG. 9 and move onto guide rails 130–135 as seen in FIG. 10. The outer guide rails 130, 131, 134 and 135 are bent inwardly toward guide rails 132, 133 (FIG. 8) so that the parisons 11 are grouped into a tight arrangement when they leave the orienter 100 at discharge point 143 (FIG. 8).

The parison orienter 100 of the present invention is unique in its simple but effective orientation of parisons received from a random bulk storage. The parison orienter not only orients the parisons but also feeds them in a controlled manner, quickly, and without excessive parison-to-parison contact or undesirable marking of the parisons. The orienter is capable of orienting a wide variety of parison designs thereby expanding its utility to the fullest amount.

Three Lane Parison Escapement

After the parisons 11 are oriented and moved into a closely-grouped arrangement by the three-lane parison orienter, the parisons move along rails 130–135 (FIG. 8) to a three-lane escapement mechanism 200. The three lanes of the escapement mechanism are individually controlled to release parisons to a parison transporter, to be described.

The purpose of the three-lane escapement mechanism is to release parisons individually from any one of the three escapement lanes in response to the demand for parisons at the corresponding blow molding machine.

Figure 11:
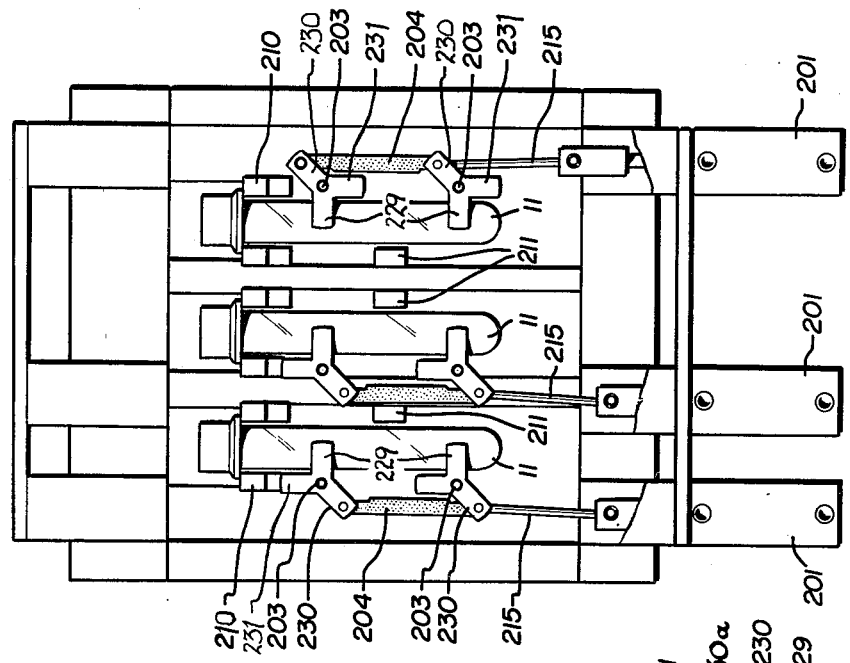
FIG. 11 is a front elevational view of the three-lane parison escapement mechanism.
Figure 13:
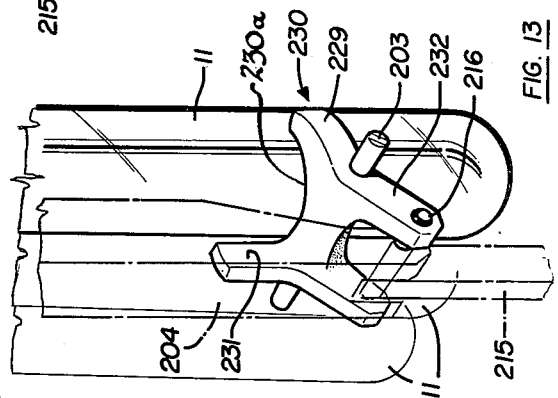
FIG. 13 is an enlarged, fragmentary, perspective view showing of a typical release element.
Figure 12:
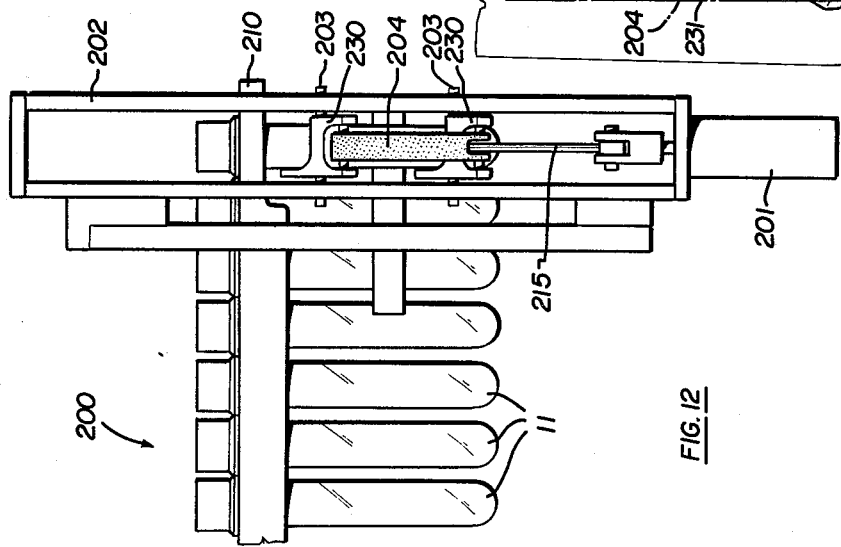
FIG. 12 is a side elevational view of the three-lane parison escapement mechanism.

Referring to FIGS. 11–13, the parisons 11 are released from the escapement mechanism 200 at the right end of the mechanism is shown in FIG. 12. The escapement mechanism 200 is inclined downwardly in the discharge direction, i.e., from left to right (FIG. 1), so that when the parisons are released, they drop onto a respective feed lane of the parison transporter 300.

Referring to FIGS. 11–13, the parison escapement mechanism includes an air cylinder 201 and separate release elements 230 for each lane. The cylinders 201 and the release elements 230 are mounted to a support frame 202. Parisons 11 are supported at their neck regions by rails 210 for sliding movement toward the end of parison escapement mechanism 200, and the parisons in each lane are in contact, the body portions of the parisons being separated by the abutting, larger neck portions. Each parison lane is separated by spacer and guide elements 211. The orientation and positioning of the parisons are shown in FIG. 12.

Each parison escapement lane has two superimposed release elements 230 pivotally mounted to support frame 202 by pivot shafts 203. A connecting link 204 connects each pair of release elements for simultaneous pivotal movement.

Referring to FIG. 13, each release element 230 includes a release leg 229 and a stop leg 231 lying at 90° to one another and joined by an arcuate surface 230a of a radius larger than the radius of teh exterior surface of the parison body portion. The pivoting of the elements 230 thus moves the stop legs relative to the parison, without moving the parison itself. The lateral extent of the leg 231 is preferably less than the distance between the body portions of adjacent parisons for the same purpose. Each cylinder 201 has actuating rod 215 that is connected to leg 232 by shaft 216 of the release elements 230. The bottom release elements are actuated by the cylinders 201, and pivotal movement of the bottom release elements causes simultaneous pivotal movement of the upper release elements through the connecting links 204.

The leading parison in each lane contacts the release legs 229 of the pair of elements 230 for that lane, so that the parisons are retained normal to the slope of the escapement lane solely by the elements. Upon actuation of the individual cylinder 201, the two elements 230 are pivoted 90° about the shafts 230. This pivotal movement drops the legs 229 from the path of the leading parison and interposes the stop legs 231 between the leading parison and the next successive parison. The leading parison then falls by gravity from the escapement lane onto the transporter, while the next successive parison is held by the stop legs 231. The return stroke of the cylinder 201 repositions the release leg 229 in front of the now-loading parison without releasing this parison. Thus, for each stroke of each cylinder 201, a parison is individually released from the escapement mechanism.

It will be noted, for purposes of fitting within space limitations, the elements 230 are inverted and reversed for the release mechanism on the right in FIG. 11. The two left units release a parison upon extension of the piston rods 215, the right unit releases upon retraction of its piston rod 215. Otherwise, the function and structure of all the mechanisms is the same.

Parison Transporter

The oriented parisons are released from the parison escapement mechanism 200 to be fed by a parison transporter to the actual load station of a blow molding machine. The parison escapement mechanism has three lanes of oriented parisons and the parison transporter also has three lanes. Each lane carries individual parisons to a stuffer tube that holds the parisons end-to-end in a line for feeding to a blow molding machine. Each line of parisons is pushed through the individual stuffer tubes to the load station of a blow molding machine.

Referring to FIG. 14, the parison transporter 300 has a conveyor structure 302 with a plurality of fall-away pushers 309 that rotate around the path established by the conveyor. Each pusher element receives a released parison from the escapement mechanism and conveys the parison to the entry portion of the stuffer tube 330 where the parison is taken from the pusher element and held in a nested position relative to a previously released and transported parison.

The parison transporter 300 has a generally rectangular support frame 301 for a conveyor 302. Referring to FIGS. 14 and 16, the conveyor 302 has three drive sprockets 305 on one of its ends and three drive sprockets 306 (FIG. 16) on its other end. Sprockets 305 are mounted on shaft 303 and sprockets 306 are mounted on shaft 304. Three separate drive chains 307 span the sprockets 305 and 306 to provide three lanes for parison transporting.

Secured to each of the chains at regular intervals are pushers 309, each such pusher being pivoted to the chain on pivot pins 310. Each pusher includes a bottom plate for contacting the bottom of a parison, an inclined guide plate 326 to aid in seating the parison on the bottom plate and a stabilizing extension 325 contacting a guide bar 311 for retaining the pusher 309 in position with its bottom plate normal to the chain 307. A parison pad 308 is also provided for each pusher, the pad being fixed to the chain in spaced relation to the pusher and having an arcuate upper surface for conforming, supporting contact with each parison supported on the adjacent pusher.

As seen in FIG. 14, each parison released from the escapement mechanism of FIGS. 11–13 falls by gravity onto the combination pad-pusher immediately adjacent to the released parison. The release is timed to the conveyor operation as later explained, so that the relative positions of FIG. 14 are always obtained. Since the pusher extension contacts the bar 311 at the point of contact and throughout the conveyance of the parison by the conveyor, the pad-pusher combination carries the parison upwardly.

As above explained, each lane of the conveyor carries each parison from the escapement mechanism to an upper stuffer tube 330 which communicates at its remote end with a molding apparatus. The stuffer tube 330 is loaded by means of a loading arm 312 bridging the gap between the tube and the conveyor 300, this arm having an undersurface interposed in the path of the parison as it is still supported on the pad-pusher combination.

The arm 312 is urged toward the conveyor by a spring assembly shown in FIG. 15 and including a spring 315 and adjusting bolts 314. The arm 312 has a retaining notch 313 which engages the neck ledge of each parison as the parison is pushed under the arm by the conveyor, the arm moving away from the conveyor against the force of the spring 315 as the parison passes under the arm. The parison is confined under the arm, after the parison leaves the conveyor, by a roller 321 on the end of a stabilizer arm 320 positioned by a fluid pressure cylinder 322. The arm and cylinder resiliently support the rollers 321. The parisons are also supported upon support wedges 316 defining separate feed lanes to the individual tubes 330.

The aligned, contacting parisons are stuffed into the tubes 330 by the conveyor which displaces the parisons upwardly to an extent such that the parison neck ledge is positioned at or beyond the notch 313. Thus, the column of parisons in the tube 330 is supported by the bottom parison retained in the notch 313.

Operation

Referring to FIG. 1, there will be described the overall operation of the parison handling assembly.

Parisons are metered into conveyor 37 of the parison metering apparatus 10 and conveyed to the parison orienter 100. The conveyor 37 receives the parisons at a controlled rate due to the unique control system including the pivot plate 29 and the control valve 47, as previously described.

A 3-lane parison orienter 100 receives the parisons from conveyor 37 and orients them into a closely grouped arrangement wherein the parisons are upright and side-by-side. As the parisons fall into an individual lane, they are directed by surfaces 110–115 (FIG. 8) between the respective power-driven shafts 104–109. The roller 128 with flexible rubber wipers prevents unoriented parsions from passing under it.

Sensor elements 401, pivotally connected by shaft 403 at the end of the parison orienter, detect the presence or absence of parisons. Sensors 401 are connected to conventional signaling apparatus such as limit switches (not shown) which energize a control timer and relays 400. When one of the sensors 401 indicate a need for parisons, an air clutch 415 for that conveyor lane is activated by control 400. A motor 402 drives the appropriate lane of conveyor 37 through the energized clutch 415. Control 400 includes a timer that keeps the conveyor 37 running for a pre-set time, approximately eight seconds, which has been found to be sufficient by replenishing the supply of parisons to the orienter.

After leaving the parison orienter, the parisons are held by the parison escapement mechanism 200 until demanded by a respective load station 411 of a blow-molding machine (not shown).

A high level proximity switch 413 and a low level proximity switch 412 determine when the parison escapement mechanism 200 must release parisons to the parison transporter 300. If no parisons are sensed by the low-level switch 412, the parison transporter control 410 is energized, which in turn, actuates the proper cylinder 201 (FIG. 11) to release parisons into transporter 300 and states the transporter conveyor. After a sufficient number of parisons backlog in the stuffer tubes 330, high level switch 413 energizes control 410 to stop any further parison release and to stop the conveyor.

It will be apparent to those skilled in the art that the foregoing disclosure is exemplary in nature rather than limiting, the invention being limited only by the appended claims.

I claim:

1. A parison handling assembly for moving tubular, blowable parisons from a random bulk storage to the load station of a blow molding machine, said parison handling system comprising:
   (a) a metering apparatus having means for feeding unoriented parisons from a random bulk storage container, at a controlled rate, to a discharge location;
   (b) parison orienting means for receiving parisons from said discharge of said metering apparatus, said parison orienting means including means for orienting said parisons into a closely grouped arrangement of oriented parisons whereby said oriented parisons are side-by-side and upright, means for actuating said metering apparatus to feed parisons to said orienting means on demand;
   (c) parison escapement means connected to said parison orienting means for releasing oriented parisons, means responsive to the number of parisons at the loading station for actuating said parison escapement means to release said oriented parisons;
   (d) a parison transporter having means for receiving oriented parisons from said parison escapement means and for transporting said parisons into the opening of a feed tube, said feed tube being connected to the load station of the blow molding machine, whereby said parisons are pushed end-to-end through said feed tubes to the respective load stations of the blow molding machines.

2. A parison handling assembly for moving tubular, blowable parisons from a random bulk storage to the load station of a blow molding machine, said parison handling assembly comprising:
(a) a metering apparatus having means for feeding unoriented parisons from a random bulk storage container, at a controlled rate, to a discharge location;
(b) parison orienting means receiving parisons from said discharge of said metering apparatus, said parison orienting means grouping said parisons in a column in which the parisons are side-by-side in substantially vertical positions;
(c) parison escapement means having pivotal release elements positioned at the discharge end of said column, means responsive to the number of parisons at the loading stations for pivoting said release elements to release said oriented parisons one at a time from said column;
(d) parison conveyor means for receiving oriented parisons from said parison escapement means and for transporting said parisons one at a time between spaced retaining elements which retain the parisons in contact and in a single column; and
(e) a feed tube through which the parisons in said column are pushed by said conveyor means to said loading station.

3. A method of transporting tubular, blowable parisons from a random bulk storage to loading stations of plural blow molding machines comprising the steps of:
(a) dumping unoriented parisons at a controlled rate from a single hopper into a metering conveyor having a separate feed lane for each load station;
(b) conveying said parisons by said metering conveyor to a parison orienter for each feed lane;
(c) orienting said parisons from each feed lane into a separate, closely grouped column in which said parisons are side-by-side and upright;
(d) releasing oriented parisons individually from each column as the parisons are demanded by said blow molding machine;
(e) conveying each released parison separately and in its own lane to the open end of a feed tube, and
(f) utilizing the motion of subsequently conveyed parisons to push parisons into and through feed tube communicating with the loading station of a blow molding machine specific to the feed lanes of said metering conveyor.

4. A method of transporting tubular, blowable parisons from a random bulk storage to load stations of plural blow molding machines comprising the steps of:
(a) feeding and conveying unoriented parisons from a random bulk storage to an orienting means;
(b) in said orienting means, grouping the parisons into a number of columns corresponding to the number of blow molding machines, the parisons in each column being side-by-side and upright;
(c) individually and sequentially releasing said oriented parisons from each column into the path of a pusher element aligned with a feed tube specific to the column and to an individual blow molding machine; and
(d) actuating the pusher element to feed individual parisons into and through its feed tube to the specific blow molding machine.

5. A method as defined in claim 4, comprising the further steps of sensing the presence of parisons at a specific location in each tube, and performing step (c) in the absence of parisons at said specific location.

6. In a parison escapement mechanism having at least one feed lane, a plurality of parisons supported by said feed lane, said parisons being closely grouped to lie side-by-side and substantially upright, said feed lane being inclined so that said parisons slide along the length of said feed lane to a release mechanism mounted on one end of said feed lane, the improvements in said release mechanism comprising: a support frame, a release element pivotally mounted on said support frame, actuating means pivotally connected to said release element, and means for actuating said actuating means, said release element having first and second abutments lying generally perpendicular to one another, said first abutment being interposed in the path of travel of the end parison in said feed lane to retain all of the parisons in said lane, and said second abutment being out of contact with said parisons but aligned with the space between the end parison and the next adjacent parison in said lane, actuation of said actuating means pivoting said release element to remove the first abutment from contact with said end parison and interposing the second abutment between the end parison and said next adjacent parison.

7. A parison transporter for transporting parisons into a feed tube connected to a load station of a blow molding machine, said feed tube having an open end adjacent said parison transporter, said parison transporter comprising: a conveyor having a drive chain, means for driving said drive chain, at least one pusher element pivotally mounted to said drive chain, at least one holder element fixed to said drive chain, and cam means mounted adjacent one side of said conveyor, a parison to be transported being held by said holder element and said pusher element whereby said cam means forces said pusher element into a position perpendicular to said drive chain during the transporting of said parison to said open end of said feed tube, said pusher element being released from said cam means to freely pivot after said parison has been fed into said open end of said feed tube.

8. A method of transporting tubular, blowable parisons from a random bulk storage to the load station of a blow molding machine comprising the steps of:
(a) metering unoriented parisons at a controlled rate from a random bulk storage onto a metering conveyor;
(b) transporting said parisons by said metering conveyor to a parison orienter;
(c) orienting said parisons into a closely grouped arrangement wherein said parisons are side-by-side and upright;
(d) feeding oriented parisons to a holding station wherein said oriented parisons are held until demanded by said blow molding machine;
(e) releasing said oriented parisons to a parison transporter in response to the demand for parisons at respective blow molding machines; and
(f) pushing the parisons in series into a feed tube which is connected to the load station.

9. A parison transporter for transporting parisons into a feed tube connected to a load station of a blow molding machine, said feed tube having an open end adjacent said parison transporter, said parison transporter comprising: a conveyor having a drive chain, means for driving said drive chain, a pusher element pivotally mounted on said drive chain and having an extended portion, and cam means mounted adjacent one side of said conveyor in the path of movement of said extended portion, and cam means contacting said extended portion to retain said pusher element in a position perpendicular to said drive chain during the transporting of said parison to said open end of said feed tube, and said cam means terminating short of said tube, so that said pusher element can freely pivot relative to the conveyor to clear the open end of said feed tube.

10. In a blow molding machine having a load station and a feed tube connected to said load station for receiving parisons, said parisons each having an open end, a neck portion and a closed end portion, said parisons moving within said feed tube end-to-end so that the closed end of one parison is nested into the open end of the next successive parison, the improvement of means for aligning said parisons with the open end of said feed tube comprising a spring biased holder arm located on one side of the path of movement of the parisons and a fluid actuated aligning cylinder located on the other side of the path of movement of the parisons, said holder arm having a notched portion that engages a parison neck portion, and a roller mounted on said aligning cylinder to engage a portion of said parison opposite the portion engaged by said holder arm.

11. In a feeding system for parisons having enlarged neck portions and reduced tubular body portions and wherein the parisons are suspended by their neck portions in a column, the parisons being side-by-side and substantially upright with their body portions spaced from one another because of the abutment of the neck portions of adjacent parisons, the column being inclined downwardly toward a discharge end, so that parisons move in column toward said discharge end as each end parison is removed at the end of the column, the improvement of a release mechanism located at said discharge end of said column and comprising a release element, means supporting said release element adjacent the discharge end of the column for pivotal movement about an axis parallel to the column, reciprocable means for pivoting said element about said axis in each direction through an arc of about 90°, said element having a pair of abutments extending radially from said axis and substantially perpendicular to one another, said abutments being spaced along the axis at a distance slightly greater than the outside diameter of a parison body portion, and means for reciprocating said pivoting means, one of said abutments normally contacting the parison at the end of said column and the other of the abutments being out of contact with any parison but aligned with the space between the end parison and the next adjacent parison, movement of said pivoting means in one direction pivoting said element to remove the one abutment from contact with the end parison and interposing the other abutment between the end parision and the next adjacent parison, thereby releasing the end parison and remaining the remainder of the parisons in column, and movement of said pivoting means in the other direction pivoting the element back to its original position so that the one abutment contacts the now end parison.

* * * * *

UNITED STATES PATENT AND TRADEMARK OFFICE
CERTIFICATE OF CORRECTION

PATENT NO. : 4,223,778
DATED : September 23, 1980
INVENTOR(S) : Robert F. Kontz

It is certified that error appears in the above—identified patent and that said Letters Patent is hereby corrected as shown below:

Column 13, line 5, "and" should be -- said --.

Signed and Sealed this

Ninth Day of February 1982

[SEAL]

Attest:

Attesting Officer

GERALD J. MOSSINGHOFF
Commissioner of Patents and Trademarks